March 13, 1962     P. M. WISBERGER     3,024,525

METHOD OF MAKING MULTI-WALLED CONCAVO-CONVEX OBJECTS

Filed Aug. 28, 1957     2 Sheets-Sheet 1

INVENTOR.
P.M. WISBERGER

BY

*ATTORNEY*

March 13, 1962 P. M. WISBERGER 3,024,525
METHOD OF MAKING MULTI-WALLED CONCAVO-CONVEX OBJECTS
Filed Aug. 28, 1957 2 Sheets-Sheet 2

INVENTOR.
P. M. WISBERGER
BY
ATTORNEY

United States Patent Office 3,024,525
Patented Mar. 13, 1962

3,024,525
METHOD OF MAKING MULTI-WALLED
CONCAVO-CONVEX OBJECTS
Paul M. Wisberger, Cuyahoga Falls, Ohio, assignor to Goodyear Aircraft Corporation, Akron, Ohio, a corporation of Delaware
Filed Aug. 28, 1957, Ser. No. 680,790
3 Claims. (Cl. 29—421)

This invention relates to making multi-walled concavo-convex objects of sheet material and is particularly useful in forming reflectors or other objects of sheet metal having a concave face of smooth contour corresponding to a surface of revolution and a backing of sheet metal generally conforming closely thereto and united thereto over certain areas thereof to reinforce the concave face. The invention is especially useful in making parabolic reflectors for radar or other short wave reflection, transmission, or reception.

It is an object of the present invention to accurately form a surface of revolution on one sheet of metal while forming a backing sheet attached thereto to provide a stiffening structure.

Another object of the invention is to tension the one sheet over and about an accurately formed male forming member while forming the reinforcing backing sheet by fluid pressure applied between the sheets.

A further object of the invention is to provide for so forming the backing sheet, while anchored to the face sheet at desired areas and while the face sheet is tensioned about a male forming member, as to provide a reinforcing member determinately spaced from the face sheet in a desired pattern.

A further object is to hold the face sheet tensioned about a form convexly formed on any line of cross-section while stretching the material of the backing sheet by pressurized fluid introduced between the sheets.

These and other objects will appear from the following description and the acompanying drawings.

Figure 7:
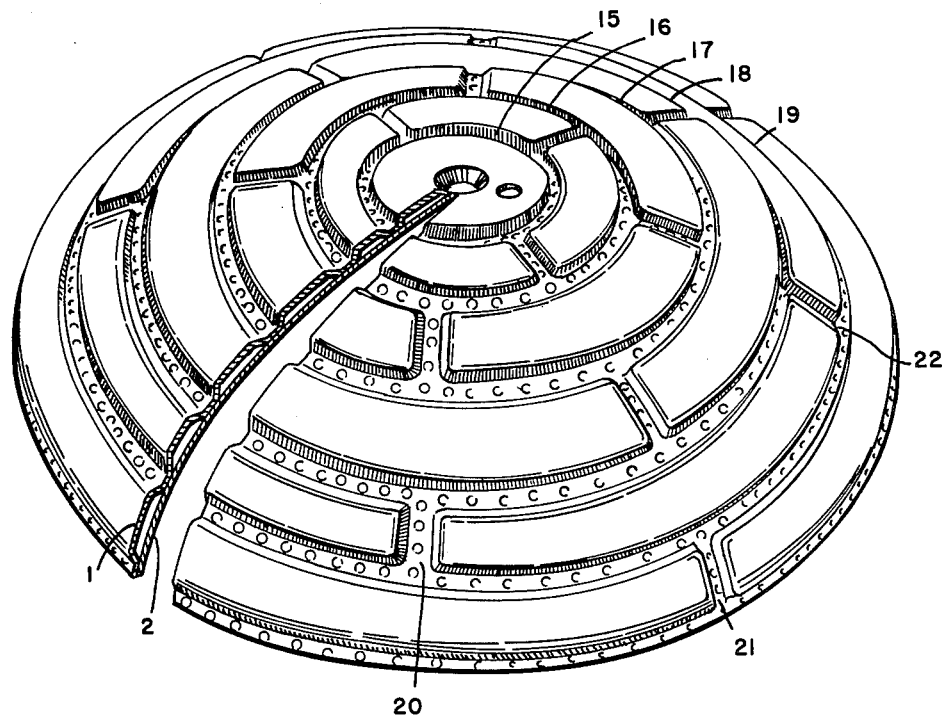
FIG. 7 is a perspective view showing one embodiment of the article produced by the method of this invention, parts of the article being broken away and parts shown in section to illustrate its construction.

Referring to the drawings, in which like numerals indicate like parts, the numerals 1, 2 indicate two sheets of metal adapted to form the backing and face sheets respectively of a concavo-convex reflector or similar article such as the article shown in FIG. 7. The superimposed sheets are joined and sealed to one another by, for example, welding or cementing along a closed line 3 usually along a circular or elliptical path within their margins to provide a closed pocket 4 between the sheets within the sealed area. In order to provide access to the closed pocket for internal pressurization by, for example, the injection of hydraulic fluid thereinto under pressure at a later period in the manufacture, an aperture 5 may be provided through the backing sheet 1, and a tubular fitting 6 may be secured in the opening in sealed relation thereto to make such a connection as is necessary to a source of pressure.

Figure 5:
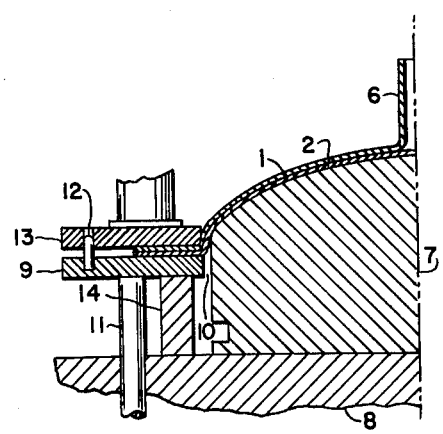
FIG. 5 is a cross-sectional view of a drawing die showing the superimposed seamed sheets therein after forming of both sheets to concavo-convex form over a male forming member.
Figure 6:
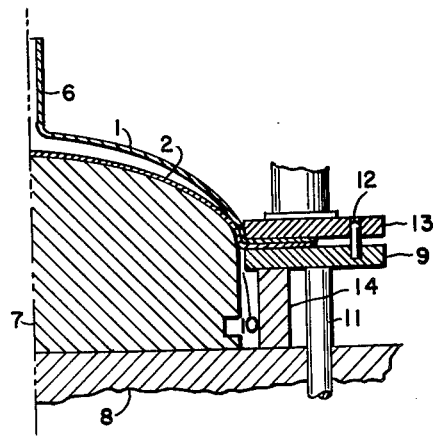
FIG. 6 is a similar view showing the sheets after the introduction of hydraulic pressure therebetween.

The seamed sheets are then simultaneously formed to concavo-convex form by stretching the superimposed sheets over a male forming member accurately formed to the desired shape of the face sheet. This may be accomplished as illustrated in FIG. 5 by use of a drawing die in which a male forming member 7 is mounted on a supporting bolster plate 8. The male forming member has a convex forming face which is usually a surface of revolution and is accurately formed to the desired shape such as a paraboloid.

About the male forming member 7 is a pressure plate 9 having a clearance opening 10 for reeciving the male forming member. The pressure plate 9 is normally supported with its upper face above the top of the male forming member by pressure pins 11 extending through the bolster in sliding relation thereto, the pressure pins being supported in turn by yieldable means such as spring or fluid pressure devices, not showing. The pressure plate may also be provided with locating pins 12 to properly locate the sheets 1, 2.

A forming die 13 is mounted above the pressure plate, and need not conform to the desired contour of the article but may merely be a ring or plate having an aperture to clear the male forming member and the sheets thereabouts. Means (not shown) are provided for forcing the die 13 downward to clamp the superimposed sheets 1 and 2 against the pressure plate 9 about the male forming member and then to proceed downwardly to stretch and form both sheets simultaneously about the male forming member. Forming is continued until the article is formed to the desired axial dimension. At this point, a stop ring 14 is provided on the bolster plate 8 to limit forming.

After simultaneously forming the superimposed sheets, and while the sheets are held in the die with the face sheet tensioned about the accurately formed surface 9, the margins of the sheets 1 and 2 being clamped between the forming die 13 and pressure plate 9, a source of hydraulic pressure is connected to the tubular connection fitting 6 and hydraulic fluid under pressure is introduced therethrough to the sealed pocket 4. The hydraulic pressure further smooths the face sheet and holds it against the male mold member while the backing sheet is forced upwardly into spaced apart relation to the face sheet. During such operation all forces acting upon the face sheet may be resolved into components acting in the plane of the sheet and producing tension therein and forces normal to the sheet and acting in a direction toward the male forming member so that no substantial change of shape occurs in the face sheet while the forces acting upon the backing sheet are resolved into forces acting in the plane of the sheet and forces acting normal to the sheet in a direction away from the male forming member and opposed only by the tensile strength of the sheet. The result is that the backing sheet is further stretched to greater curvature.

Figure 1:
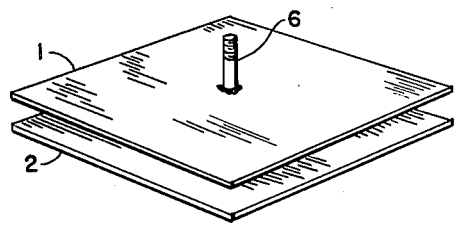
FIG. 1 is a perspective view of two superimposed sheets of metal illustrating an initial step of the method of the invention.
Figure 2:
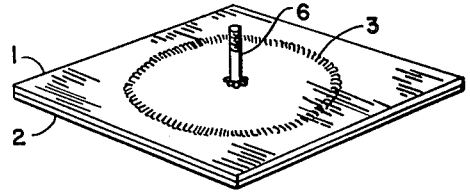
FIG. 2 is a view similar to FIG. 1 showing the superimposed sheets seamed or welded to provide a sealed pocket between the sheets.
Figure 3:
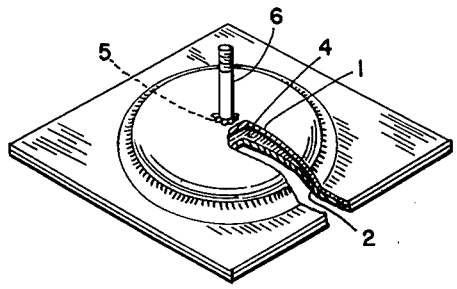
FIG. 3 is a perspective veiw of the initial superimposed sheets formed to concavo-convex form with the backing sheet spaced from the face sheet within the sealed area, part of the sheet being broken away.
Figure 4:
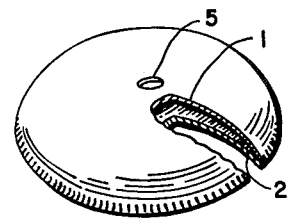
FIG. 4 is a perspective view of the formed article after trimming.

In come cases, it may be desired to provide a backing sheet so formed as to contact the face sheet and to be united thereto over certain areas and to be spaced therefrom over others so as to provide further support and strengthening of the face sheet. For example, in the embodiment illustrated in FIG. 7, the face sheet 2 and the backing sheet 1 are first superimposed as in FIG. 1 and welded about an annular path as in FIG. 2, to seal them peripherally to one another. At the same time, or therebefore the sheets are also spot welded one to another at intervals in a pattern which may comprise a series of concentric circles 15, 16, 17, 18, 19 or along radial lines as at 20, 21, and 22 or in any other desired pattern. The united sheets are then formed in a die as shown in FIG. 5. However, when hydraulic fluid is admitted under pressure between the sheets, the sheets being still held in the die as previously described, those portions of the backing sheet which are not directly secured to the face sheet are stretched into spaced relation thereto while those areas directly welded to the face sheet are not spaced therefrom and the backing sheet is therefore formed to ribbed or dimpled shape depending upon the design arrangement of the spot welding.

The invention is particularly useful in the manufacture of parabolic reflectors used for radar transmission or reception where the reflectors are of considerable size but must be of simple construction and of light weight as the entire reflector may be constructed of thin sheet metal such as aluminum or magnesium alloys or stainless steel.

Where greater strength of the metal article is desired, after removal of the article from the forming die, the space between the face and backing sheets may be filled with foamed plastic material. This may be accomplished by injecting a foamed dispersion of plastic material through the connection fitting and causing the foamed material to set up or harden in place in the spaces between the face sheet and the backing sheet.

The metal structure may be trimmed after it is removed from the forming die, preferably by removing the free margins of the sheets outside the welded area which unites the sheets.

While a certain representative embodiment and details have been shown for the purpose of illustrating the invention, it will be apparent to those skilled in the art that various changes and modifications may be made therein without departing from the spirit or scope of the invention.

I claim:

1. The method of making a multi-walled concavo-convex object, such as radar reflector, having a convex inner face layer comprising a smooth symmetrical surface of revolution and a reinforcing structure of sheet metal for backing the inner surface, said method comprising placing a plurality of metal sheets in superimposed relation, welding one sheet to another about a closed course within their margins to form a pocket therebetween, clamping the margins of the assembled sheets against wrinkling while simultaneously forming both sheets by stretching the sheets over a male forming member having the desired shape of the surface of revolution, introducing a fluid under pressure into said pocket to form without confinement the outermost sheet away from and into spaced relation with the innermost sheet while still tensioning the innermost sheet about the male forming member and smoothing the innermost sheet by support from the male forming member and continuing to clamp the margins of the sheets, releasing the fluid pressure, and removing the article from the clamping means.

2. The method of making a multi-walled concavo-convex radar reflector having a convex inner face layer comprising a smooth symmetrical surface of revolution and a reinforcing structure of sheet metal for backing the inner surface, said method comprising placing a plurality of metal sheets in superimposed relation, welding one sheet to another about a closed course within their margins to form a pocket therebetween, welding the sheets to each other, in spots within said pocket, clamping the margins of the assembled sheets against wrinkling while simultaneously forming both sheets by stretching them over a male forming member having the desired shape of the surface of revolution, introducing a fluid under pressure into said pocket to form without confinement the outermost sheet away from and into spaced relation with the innermost sheet over areas of the sheets not secured by welding while maintaining the tensioning of the innermost sheet about the male forming member and while continuing to clamp the margins of the sheets, releasing the fluid pressure, and removing the article from the clamping means.

3. That method of forming a radar reflector which includes the steps of positioning a pair of metal sheets in face to face engagement, sealing the sheets together in an endless line spaced from the margins of the sheets, permanently stretch-forming the sheets simultaneously to form a double-walled parabolic shape, the sealed line lying in the area of the sheets which are stretch-formed, holding without permanent distortion the sheet on the concave side of the parabolic shape stationary by tension applied to the margins of the sheets, applying fluid pressure internally between the stretch-formed sheets inside the welded seam to move permanently the sheet having the exposed convex surface into spaced relation with the held sheet and with the outer sheet unconfined, and trimming the sheets to the outside of the welded seam.

References Cited in the file of this patent

UNITED STATES PATENTS

| | | |
|---|---|---|
| 1,294,486 | Kuen | Feb. 18, 1919 |
| 1,709,865 | Muffly | Apr. 23, 1929 |
| 2,331,464 | Fillo | Oct. 12, 1943 |
| 2,582,358 | Schoellerman | Jan. 15, 1952 |
| 2,759,247 | Grenell et al. | Aug. 21, 1956 |

FOREIGN PATENTS

| | | |
|---|---|---|
| 13,735 | Great Britain | Apr. 7, 1900 |